(12) United States Patent
Wodausch et al.

(10) Patent No.: US 11,208,962 B2
(45) Date of Patent: Dec. 28, 2021

(54) METHOD AND DEVICE FOR VENTING THE TANK OF A VEHICLE

(71) Applicant: VOLKSWAGEN AKTIENGESELLSCHAFT, Wolfsburg (DE)

(72) Inventors: Jens Wodausch, Braunschweig (DE); Björn Fröhlich, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/547,775

(22) Filed: Aug. 22, 2019

(65) Prior Publication Data

US 2020/0063672 A1    Feb. 27, 2020

(30) Foreign Application Priority Data

Aug. 22, 2018    (DE) ............... 10 2018 120 443.4

(51) Int. Cl.
| | |
|---|---|
| *F02D 41/00* | (2006.01) |
| *B60K 15/035* | (2006.01) |
| *F02M 25/08* | (2006.01) |

(52) U.S. Cl.
CPC ...... *F02D 41/004* (2013.01); *B60K 15/03519* (2013.01); *F02D 41/0007* (2013.01);
(Continued)

(58) Field of Classification Search
CPC ............... F02D 41/0007; F02D 41/004; F02D 2200/10; F02M 25/08; F02M 25/0836;
(Continued)

(56) References Cited

U.S. PATENT DOCUMENTS

| | | |
|---|---|---|
| 2014/0034009 A1 | 2/2014 | Brinkmann et al. |
| 2016/0201615 A1 | 7/2016 | Pursifull et al. |
| 2016/0341155 A1* | 11/2016 | Dudar ............. F02B 37/164 |

FOREIGN PATENT DOCUMENTS

| | | |
|---|---|---|
| DE | 10 2011 100 512 A1 | 11/2012 |
| DE | 10 2012 200 583 A1 | 7/2013 |
| DE | 10 2016 100 094 A1 | 7/2016 |

OTHER PUBLICATIONS

Braess, H. et al. "Vieweg Handbuch Kraftfahrzeugtechnik." pp. 275-277.
(Continued)

*Primary Examiner* — Jesse S Bogue
*Assistant Examiner* — Loren C Edwards
(74) *Attorney, Agent, or Firm* — Pearl Cohen Zedek Latzer Baratz LLP

(57) ABSTRACT

A method for venting the tank of a vehicle, a device for venting the tank of a vehicle, as well as a vehicle are provided. In this context, the vehicle in which the method is employed has an internal combustion engine that can be operated with a fuel, an air supply system, an exhaust gas system comprising at least an exhaust gas turbocharger, a fuel tank that is designed to supply the internal combustion engine with fuel, and a fuel vapor sorption system. It is provided that, in the method or by means of the device, a drive flow in the air supply system is regulated as a function of an altitude reserve of the exhaust gas turbocharger and as a function of an engine load point, so that the flushing air volume flow of the tank venting system that ensues is determined and can be supplied as a function of an altitude rotational speed of the exhaust gas turbocharger and as a function of the engine load point.

6 Claims, 3 Drawing Sheets

(52) U.S. Cl.
CPC ...... *F02M 25/089* (2013.01); *F02M 25/0836* (2013.01); *B60K 2015/0358* (2013.01); *F02D 2200/10* (2013.01)

(58) Field of Classification Search
CPC ................ F02M 25/089; B60K 15/035; B60K 15/03519; B60K 2015/0358
See application file for complete search history.

(56) References Cited

OTHER PUBLICATIONS

Search report for German Patent Application No. 10 2018 120 443.4, dated Apr. 30, 2019.

* cited by examiner

METHOD AND DEVICE FOR VENTING THE TANK OF A VEHICLE

CROSS-REFERENCE TO RELATED APPLICATION

This application claims priority from German Patent Application No. 10 2018 120 443.4, filed Aug. 22, 2018, which is hereby incorporated by reference in its entirety.

FIELD OF THE INVENTION

The invention relates to a method for venting the tank of a vehicle as well as to a device for venting the tank of a vehicle as well as to a vehicle.

SUMMARY OF THE INVENTION

The fuel used for operating internal combustion engines that serve, for instance, to propel a vehicle, is stored in fuel tanks. Depending on the outside temperature, on the free liquid surface area of the fuel, etc., fuel vapors, particularly low-molecular hydrocarbons, evaporate to varying extents. These fuel vapors are normally captured in an activated carbon filter that is installed in a vent line of the tank. Since the loading capacity of activated carbon filters is limited, they have to be flushed with an air flow from time to time. It goes without saying that the flushing air flow laden with fuel vapors desorbed by the filter must not be released into the environment without first being treated. In this context, it is a known procedure to feed the flushing air flow to the internal combustion engine so that the hydrocarbons contained in the flushing air flow can be burned in the engine.

New emissions regulations require higher flushing air rates from the tank venting system. In order to comply with this legislation, tank venting concepts comprising two feed sites are used, whereby the feed site is implemented by means of a Venturi nozzle. The Venturi nozzle functions in the charged intake-manifold pressure range of the internal combustion engine since, at this operating point, a pressure delta ensues through the Venturi nozzle, as a result of which the flushing effect is intensified. The Venturi nozzle has an optimal operating point in terms of the quantity of flushing air that is conveyed. The flushing air quantity is proportional to the drive flow through the Venturi nozzle, that is to say, a greater flushing air quantity gives rise to a greater drive flow. The increase in the drive flow has a negative effect on the altitude reserve of the exhaust gas turbocharger since the greater drive flow or leakage flow is compensated for by a higher rotational speed of the exhaust gas turbocharger. As a result, the maximum flushing air quantity is limited by the maximum rotational speed of the exhaust gas turbocharger. However, since the latter depends on the requested engine load point, the supplied flushing air quantity should be additionally determined as a function of the engine load point in order to feed in the maximum flushing air quantity that is permissible for the engine under a given altitude condition.

In the solutions according to the state of the art that have been published thus far, the Venturi nozzle has a conservative design in order to ensure a sufficient altitude reserve of the exhaust gas turbocharger. The drive flow results from the pressure delta that ensues. In this context, the drive flow is not regulated when the Venturi principle is employed to increase the flushing air quantity. This translates into a waste of potential in terms of the flushing air quantity that is to be conveyed. This drawback is currently circumvented, for example, in that a compromise-based data input is carried out for the tank venting system, taking into account the altitude reserve of the exhaust gas turbocharger. Moreover, additional alternative concepts can be gleaned from the state of the art.

For instance, German patent application DE 10 2012 200 583 A1 discloses a tank venting system with a bypass valve. Here, this tank venting system is provided for a combustion machine. The system has a compressor installed in an intake air channel as well as a bypass around the compressor that is connected to a fuel system. A valve is installed in the bypass and it controls the air mass that can flow through the bypass as a function of the load. The load-dependent control of the valve is regarded as a generic term to express the torque delivered by the combustion machine or the air mass supplied to the combustion machine or the ambient pressure prevalent in the intake air channel. In this context, no provision is made for a dependence of an altitude rotational speed of the exhaust gas turbocharger in conjunction with load-dependent control.

SUMMARY OF THE INVENTION

The invention is thus based on the objective of putting forward a method for venting the tank that ensures optimal operational management in terms of achieving excellent venting, taking into consideration the operating state of the entire system.

A preferred embodiment of the invention provides for a method for venting the tank of a vehicle, whereby the vehicle has the following: an internal combustion engine that can be operated with a fuel, an air supply system, an exhaust gas system comprising at least an exhaust gas turbocharger, a fuel tank that is designed to supply the internal combustion engine with fuel, a fuel vapor sorption system, whereby a drive flow in the air supply system is regulated as a function of an altitude reserve of the exhaust gas turbocharger and as a function of an engine load point, so that the flushing air volume flow of the tank venting system that ensues is determined and can be supplied as a function of the altitude rotational speed of the exhaust gas turbocharger and as a function of the engine load point. In this manner, the flushing air volume flow or the tank venting mass flow that ensues due to the dependence on the engine load is optimal, not only in terms of the altitude reserve but also concurrently at any engine load point, so that, on the average, a higher and thus better flushing air quantity is obtained here. The presented method makes it possible to maintain the full engine power with a concurrent, for example, maximum tank venting mass flow. In the prior-art solutions, a compromise is always made between the engine performance and the flushing air quantity, whereby such a compromise has an effect on the structural design of the components, for instance, a Venturi nozzle and an engine application. This can be advantageously avoided by means of the presented method and there is no need for such a compromise. For example, it can happen that, as the altitude and heat increase, a maximum flushing air quantity can no longer be provided on the basis of an altitude reserve of the exhaust gas turbocharger. The method makes it possible to regulate the drive flow in the above-mentioned manner, so that a flushing air flow can be limited or determined in accordance with the ambient conditions. In this process, this limitation or determination is carried out taking into account the current engine load point, that is to say, the adjusted volume flow of flushing air is always determined as a function of the altitude (rotational speed of the exhaust gas turbocharger) and as a function of the engine load point. Therefore, optimal operational management can be ensured in terms of achieving excellent venting, taking the operating state of the entire system into consideration. For example, the dependence of the maximum flushing air quantity on the ambient pressure (altitude) is progressive. In other words, the flushing air quantity increases as the pressure rises. This dependence can be depicted in a characteristic map. As the engine load varies, this characteristic is shifted, for example, uniformly, in the characteristic map, that is to say, the higher the engine load, the lower the flushing air quantity at each pressure point. As an alternative, it is conceivable for a linear dependence on the ambient pressure to ensue in such a way that the increase in the limitation degrees diminishes as the engine load rises. By the same token, a regulation can be carried out in such a way that, starting at a sufficient ambient pressure (p*), a limitation curve can be used that is identical over all of the loads. The presented variants of the method can be implemented, for instance, with the concepts shown in FIGS. 1 to 3.

Another preferred embodiment of the invention puts forward a device for venting the tank of a vehicle, whereby the vehicle has the following: an internal combustion engine that can be operated with a fuel, an air supply system, an exhaust gas system comprising at least an exhaust gas turbocharger, a fuel tank that is designed to supply the internal combustion engine with fuel, a fuel vapor sorption system, whereby a drive flow in the air supply system is regulated as a function of an altitude reserve of the exhaust gas turbocharger and as a function of an engine load point so that a flushing air volume flow of the tank venting system that ensues is always determined and can be supplied as a function of the altitude rotational speed of the exhaust gas turbocharger and of the engine load point. The advantages mentioned above likewise apply to the device.

Another preferred embodiment puts forward a vehicle. In this context, the vehicle has the following: an internal combustion engine that can be operated with a fuel, an air supply system, an exhaust gas system comprising at least an exhaust gas turbocharger, a fuel tank that is designed to supply the internal combustion engine with fuel, a fuel vapor sorption system as well as a control unit configured to carry out a method. The advantages mentioned above likewise apply to the vehicle.

Additional preferred embodiments of the invention can be gleaned from the other features cited in the subordinate claims.

Another preferred embodiment of the invention provides for the drive flow to be generated by a Venturi nozzle. For example, under normal conditions (normal altitude of zero, outside temperature of 20° C.), this Venturi nozzle conveys a maximum volume flow of flushing air from the fuel vapor sorption system which can be, for instance, an activated carbon canister. A particularly reliable drive flow can be provided by the Venturi nozzle.

Moreover, in another preferred embodiment of the invention, it is provided for the drive flow to be regulated by means of at least one regulation device as a function of the altitude reserve of the exhaust gas turbocharger and as a function of the engine load point. In the prior-art solutions, it can already be assumed to be known that the Venturi principle is used to increase the flushing air quantity. Here, however, the drive flow is not regulated. This translates into a waste of potential in terms of the flushing air quantity that is to be conveyed. This situation is different in the method being presented here. Here, it is possible to regulate the drive flow very exactly and, in this process, the above-mentioned dependencies can be taken into account very precisely, so that a highly efficient operational management of the tank venting system can be attained in any operating state of the entire system. In other words, the method can also be seen as a tank venting regulation that is dependent on the engine load point and that has an adjustable Venturi nozzle, whereby the operating state of the exhaust gas turbocharger can be additionally taken into consideration.

Moreover, in another preferred embodiment of the invention, it is provided for the regulation device to comprise at least one control valve. A control valve can be easily integrated into an existing system constellation and can be used to achieve a very simple and precise regulation.

In yet another preferred embodiment of the invention, it is provided for the at least one control valve to be installed downstream or upstream from the Venturi nozzle. Depending on the arrangement, the drive flow and thus the volume flow of flushing air for the tank venting can be regulated. The preferred arrangement can be selected on the basis of the entire system in question.

Furthermore, in another preferred embodiment of the invention, it is provided for the fuel vapor sorption system to have at least one tank vent valve, whereby this at least one tank vent valve is installed upstream from the Venturi nozzle or upstream from the internal combustion engine. Therefore, depending on the positioning, the method can thus be influenced so as to ensure an optimal operational management in terms of achieving an excellent venting, taking into consideration the operating state of the entire system.

Moreover, in another preferred embodiment of the invention, it is provided for the vehicle to have at least one control unit by means of which the altitude reserve of the exhaust gas turbocharger or the altitude rotational speed of the exhaust gas turbocharger and the load point of the internal combustion engine can be determined.

This allows a particularly reliable determination. Moreover, optionally additional information can thus be processed and optionally an optimization algorithm can be stored which is configured to process incoming information accordingly, thus ultimately attaining optimal tank venting in any operating state. In this manner, it is likewise possible to generate processed information and to then transmit it to a user, without these individually incoming measured values having to be independently evaluated by the exhaust gas turbocharger or by the internal combustion engine.

It is also provided in another preferred embodiment of the invention that the method comprises the following steps: determining the load point of the internal combustion engine, determining the altitude reserve of the exhaust gas turbocharger or the altitude rotational speed of the exhaust gas turbocharger, regulating the drive flow in the air supply system as a function of the determined altitude reserve of the exhaust gas turbocharger or as a function of the altitude rotational speed of the exhaust gas turbocharger and as a function of the determined engine load point. The above-mentioned advantages likewise apply to the presented steps of the method.

The invention can typically be employed in internal combustion engines, especially in any gasoline engines.

Unless otherwise indicated in a specific case, the various embodiments of the invention cited in this application can be advantageously combined with each other.

BRIEF DESCRIPTION OF THE DRAWINGS

The invention will be explained below in embodiments on the basis of the accompanying drawings. The following is shown.

DETAILED DESCRIPTION OF THE INVENTION

Figure 1:
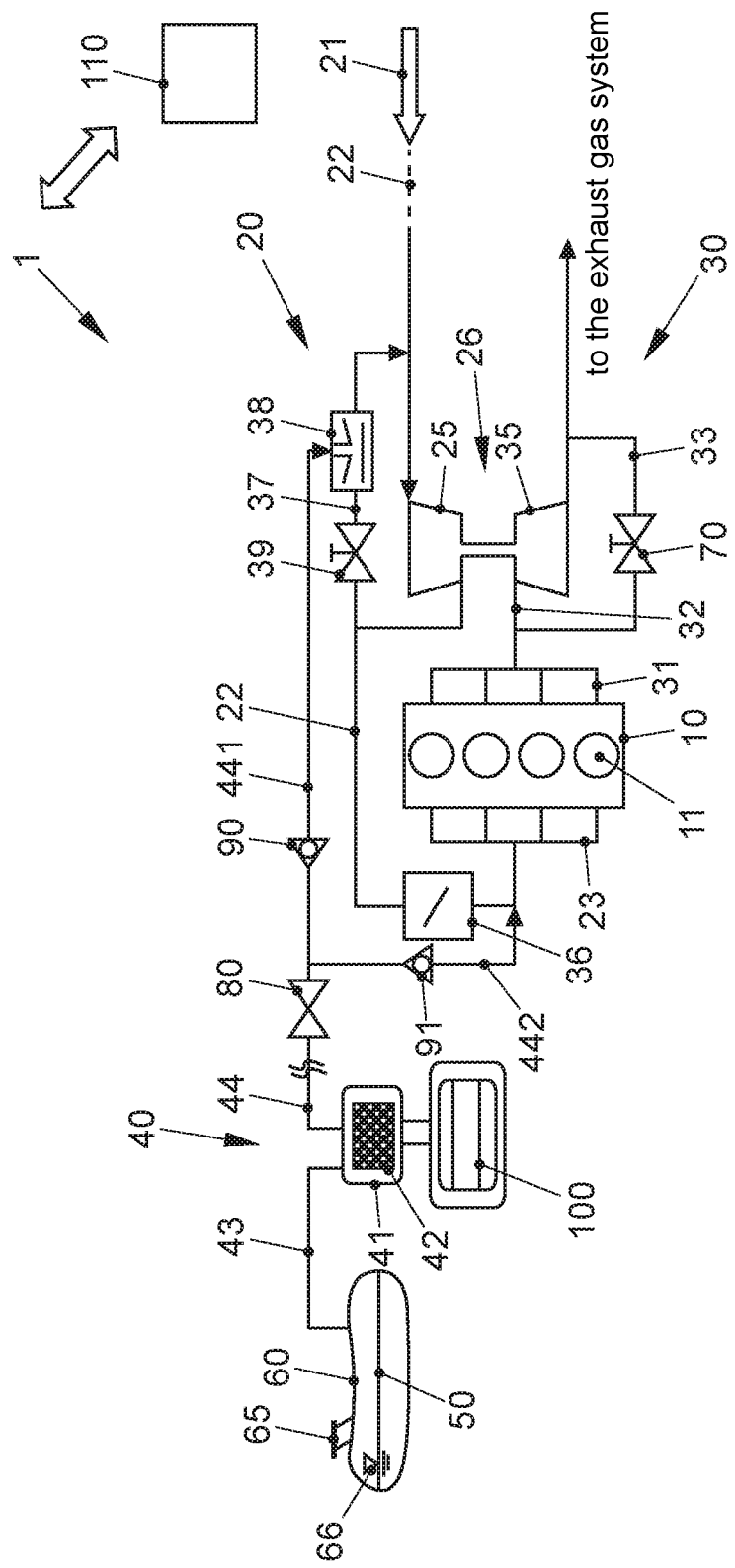
FIG. 1: block diagram of a vehicle according to the invention.

FIG. 1 shows a block diagram of a vehicle 1 according to the invention. In other words, FIG. 1 shows a vehicle that is designated in its entirety by the reference numeral 1, in which the presented method can be used analogously and the presented device is put forward correspondingly. The vehicle 1 comprises an internal combustion engine 10, an air supply system 20, an exhaust gas system 30 as well as a fuel vapor sorption system 40. Even though a fuel vapor sorption system 40 is not explicitly presented, it is nevertheless understood that such a system is being put forward.

The internal combustion engine 10 comprises at least one cylinder 11, here, for instance, four cylinders 11, and can be a (self-igniting) diesel engine or an (externally ignited) gasoline engine. In the present example, it is a gasoline engine ignited by means of spark plugs.

The internal combustion engine 10 can be operated with a fuel 50, gasoline in the case here. The fuel 50 is stored in a fuel tank 60 that can be filled via a filler neck 65 and that is configured with a level sensor 66 which detects the filling level. The fuel 50 is fed to the internal combustion engine 10 via a fuel supply system (not shown here).

The combustion air 21 is conveyed to the engine 10 via the air supply system 20 which draws in air 21 from the surroundings and feeds it into the engine 10 via a suction line 22 and an air manifold 23 that distributes the air 21 to the cylinders 11. In the example presented here, the combustion air 21 is compressed by a compressor 25 of an exhaust gas turbocharger 26 so that the engine 10 can be operated at an elevated charge pressure and thus at a higher output. The compressor 25 is driven via a shaft by a turbine 35 installed in the exhaust gas system 30. In the suction line 22 downstream from the compressor 25, there is an adjustable throttle valve 36 by means of which the filling of the cylinder can be controlled or regulated. The air supply system 20 also has a return flow line 37 that branches off from the suction line 22 downstream from the compressor 25 and that opens up once again into the suction line 22 upstream from the compressor 25. A Venturi nozzle 38 is installed in the return flow line 37. Before this Venturi nozzle 38, and in this example, downstream from Venturi nozzle 38, there is also a control valve 39 which, in this case, serves as the only component of a regulation device.

Exhaust gas stemming from the internal combustion engine 10 is carried away via the exhaust gas system 30 and, if applicable, it undergoes a catalytic aftertreatment. For this purpose, the exhaust gas system 30 comprises an exhaust gas manifold 31 which collects the exhaust gases from the cylinders 11 of the engine 10 and conveys them into a shared exhaust gas channel 32. The above-mentioned turbine 35 of the exhaust gas turbocharger 26 is installed in the exhaust gas channel 32, so that, while withdrawing kinetic energy, the exhaust gas drives the turbine 35 and thus the compressor 25. The turbine 35 can be bypassed by means of a turbine bypass 33, whereby the portion of the exhaust gas conveyed through the turbine bypass 33 can be adjusted by means of an actuating element 70 which is installed in the turbine bypass 33 and which can be, for example, a waste gate or else generally, it can be a valve that can be actuated electrically.

The fuel vapor sorption system 40 has a sorbent canister 41 which contains a sorbent 42 for the sorption of fuel vapors, in other words, hydrocarbons. The term "sorption" as set forth here refers to any reversible bonding, for instance, absorption, physical adsorption (physisorption) and/or chemical adsorption (chemisorption). Preferably, the sorbent 42 is activated carbon, especially an activated carbon filter that binds fuel vapors through physical adsorption. In this vein, the sorbent canister 41 can also be referred to as an activated carbon canister. The sorbent canister 41 is connected to the fuel tank 60 via a fuel vapor line 43. A flushing line 44 branches off from the sorbent canister 41 and splits into a first partial flushing line 441 and a second partial flushing line 442. The first partial flushing line 441 opens up into the return flow line 37 via the suction side of the Venturi nozzle 38. The second partial flushing line 442 opens up into the suction line 22 downstream from the throttle valve 36 or directly into the air manifold 23. A tank vent valve 80 that serves to set, especially to limit, the volume flow in the flushing line 44 is installed in the shared section of the flushing line 44. The tank vent valve 80 can be configured, for instance, as a valve that can be adjusted by means of an electric motor. Each of the partial flushing lines 441, 442 contains a blocking element 90, 91, each of which is configured to allow a flow only in the direction of the return flow line 37, the suction line 22 or the air manifold 23. If the downstream pressure at the blocking element 90, 91 is greater than the upstream pressure or greater than a prescribed pressure, then the blocking elements 90, 91 close automatically. The fuel vapor sorption system 40 also comprises a diagnostic module 100 that is fluidically connected to the sorbent canister 41 via two lines. The diagnostic module 100 has a pressure relief valve and a pump (neither of which is shown here). The diagnostic module 100 serves, on the one hand, to equalize the pressure of the sorbent canister 41 and of the fuel tank 60 and, on the other hand, to monitor the tank for leakage.

Moreover, FIG. 1 also shows a control unit 110. The double-headed arrow shows the functional link to the vehicle 1. The components shown can be functionally networked with each other, and analogously coupled to each other as set forth in the invention, or else networked and coupled to each other via the depicted control unit 110 shown in accordance with a switched-over logic or in accordance with an optimization algorithm provided in the control unit 110. In all of these cases, the method presented here can be implemented in such a way that an optimal operational management can be ensured in terms of achieving excellent venting, taking into consideration the operating state of the entire system.

Figure 2:
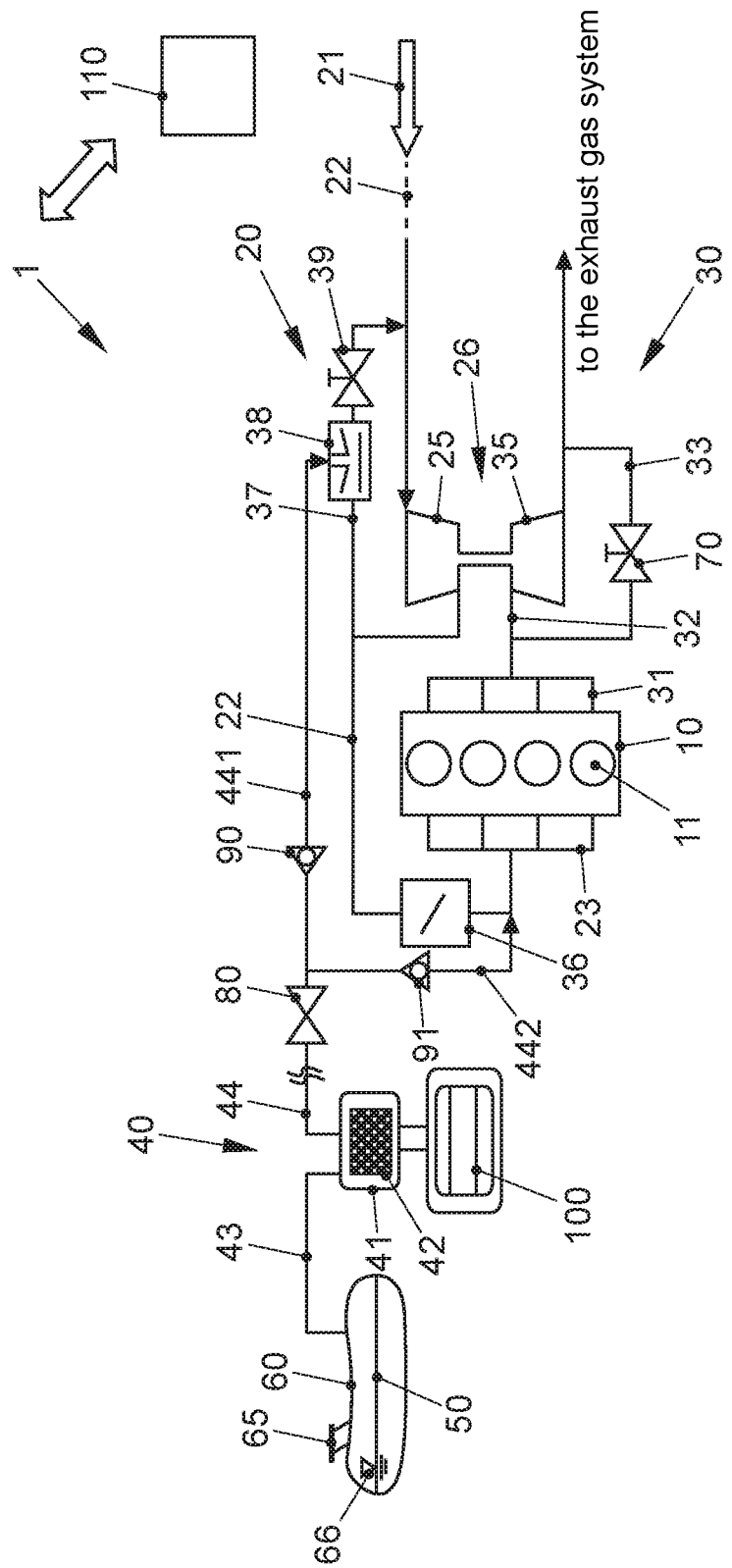
FIG. 2: another block diagram of a vehicle according to an alternative embodiment of the invention.

FIG. 2 shows another block diagram of a vehicle 1 according to an alternative embodiment of the invention. The components shown and their positioning are essentially identical to the structure shown in FIG. 1. In FIG. 2, only the positioning of the control valve 39 is different. As above, there is a Venturi nozzle 38 in the return flow line 37. Before this Venturi nozzle 38, and in this example upstream from the Venturi nozzle 38, said control valve 39 is shown which, in this case, serves as the only component of a regulation device.

Figure 3:
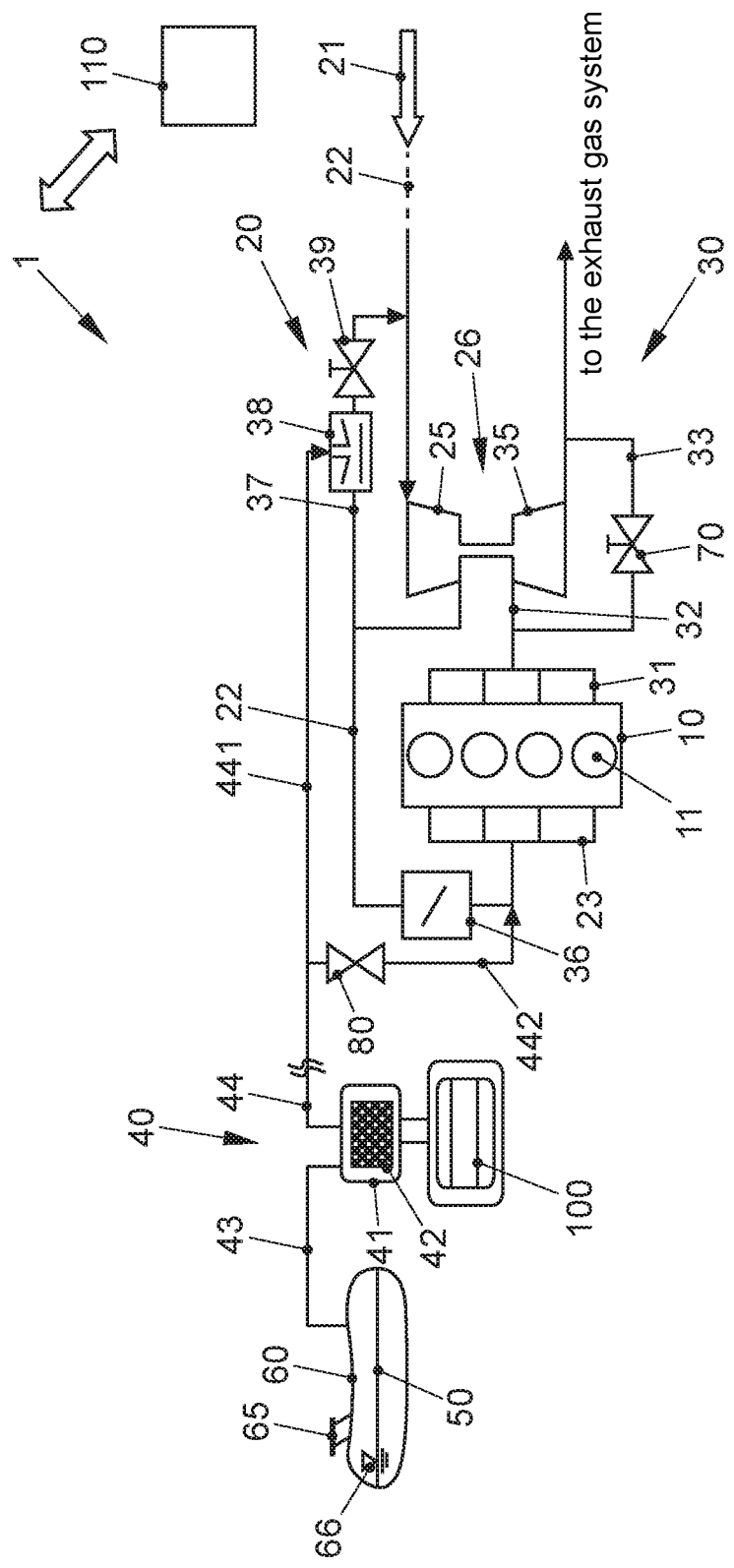
FIG. 3: another block diagram of a vehicle according to an alternative embodiment of the invention.

FIG. 3 shows another block diagram of a vehicle 1 according to an alternative embodiment of the invention. The components shown and their positioning are essentially identical to the structure shown in FIG. 1. Only the positioning of the control valve 39 is different in FIG. 3. As above, there is a Venturi nozzle 38 in the return flow line 37. Before this Venturi nozzle 38, and in this example upstream from the Venturi nozzle 38, said control valve 39 is shown which, in this case, serves as the only component of a regulation device. Moreover, in FIG. 3, the tank vent valve 80 shown is provided directly in the partial flushing line 442 (in contrast to the positioning in FIG. 1). Also, in FIG. 3, generally speaking, there are no blocking elements 90, 91 in the partial flushing lines 441, 442.

LIST OF REFERENCE NUMERALS 01 vehicle
10 internal combustion engine
11 cylinder
20 air supply system
21 combustion air
22 suction line
23 air manifold
25 compressor
26 exhaust gas turbocharger
30 exhaust gas system
32 exhaust gas channel
33 turbine bypass
35 turbine
36 throttle valve
37 return flow line
38 Venturi nozzle
39 control valve
40 fuel vapor sorption system
41 sorbent canister
42 sorbent
43 fuel vapor line
44 flushing line
50 fuel
60 fuel tank
61 filling nozzle
66 level sensor
70 actuating element
80 tank vent valve
90 blocking element
91 blocking element
100 diagnostic module
110 control unit
441 partial flushing line
442 partial flushing line

The invention claimed is:

1. A method for venting a fuel tank of a vehicle, wherein the vehicle has the following:
an internal combustion engine that can be operated with a fuel,
an air supply system,
an exhaust gas system comprising at least an exhaust gas turbocharger,
at least one control unit configured to determine: an altitude reserve of the exhaust gas turbocharger, an altitude rotational speed of the exhaust gas turbocharger, and a load point of the internal combustion engine, and
a fuel vapor sorption system,
wherein the fuel tank is designed to supply the internal combustion engine with the fuel,
the method comprising:
determining the load point of the internal combustion engine;
determining the altitude reserve of the exhaust gas turbocharger and optionally the altitude rotational speed of the exhaust gas turbocharger;
determining a flushing air volume flow of a fuel tank venting system of the fuel tank to be supplied based on the determined altitude reserve of the exhaust gas turbocharger and the determined load point of the internal combustion engine;
supplying the determined flushing air volume flow by regulating a drive flow in the air supply system:
by a Venturi nozzle as a function of the determined altitude reserve of the exhaust gas turbocharger and the load point of the internal combustion engine, and by means of at least one regulation device as a function of:
the determined altitude reserve of the exhaust gas turbocharger and the determined load point of the internal combustion engine, or
the determined altitude rotational speed of the exhaust gas turbocharger and the determined load point of the internal combustion engine.

2. The method according to claim 1, wherein the regulation device comprises at least one control valve.

3. The method according to claim 2, wherein the at least one control valve is installed downstream or upstream from the Venturi nozzle.

4. The method according to claim 1, wherein the fuel vapor sorption system has at least one tank vent valve, wherein the at least one tank vent valve is installed upstream from the Venturi nozzle or upstream from the internal combustion engine.

5. A device for venting a fuel tank of a vehicle, wherein the vehicle has the following: an internal combustion engine that can be operated with a fuel, an air supply system, an exhaust gas system comprising at least an exhaust gas turbocharger, wherein the fuel tank is designed to supply the internal combustion engine with the fuel, a fuel vapor sorption system, and a Venturi nozzle, wherein the device for venting the fuel tank comprises at least one control unit configured to:
determine an altitude reserve of the exhaust gas turbocharger; an altitude rotational speed of the exhaust gas turbocharger, and a load point of the internal combustion engine; and
regulate, via the Venturi nozzle, a drive flow in the air supply system as a function of the altitude reserve of the exhaust gas turbocharger and as a function of the load point of the internal combustion engine, so that a flushing air volume flow of a tank venting system that ensues is determined and can be supplied as a function of the altitude rotational speed of the exhaust gas turbocharger and as a function of the load point of the internal combustion engine.

6. A vehicle, comprising:
an internal combustion engine that can be operated with a fuel;
an air supply system;
an exhaust gas system comprising at least an exhaust gas turbocharger;
a fuel tank that is designed to supply the internal combustion engine with the fuel;
a fuel vapor sorption system;
a Venturi nozzle;
at least one regulation device; and
a control unit configured to carry out a method for venting the fuel tank of the vehicle, comprising the following steps:

determining a load point of the internal combustion engine;

determining an altitude reserve of the exhaust gas turbocharger and optionally the altitude rotational speed of the exhaust gas turbocharger;

determining a flushing air volume flow of a fuel tank venting system of the fuel tank to be supplied based on the determined altitude reserve of the exhaust gas turbocharger and the determined load point of the internal combustion engine; and supplying the determined flushing air volume flow by regulating a drive flow in the air supply system by means of:
- the Venturi nozzle as a function of the determined altitude reserve of the exhaust gas turbocharger and the load point of the internal combustion engine, and
- the at least one regulation device as a function of the determined load point of the internal combustion engine as a function of:
  - the determined altitude reserve of the exhaust gas turbocharger, or
  - the altitude rotational speed of the exhaust gas turbocharger and the determined load point of the internal combustion engine.

* * * * *